Nov. 26, 1968   C. GIBAS   3,413,580

MULTI-COMPONENT ELECTROMAGNET

Filed July 1, 1966   3 Sheets-Sheet 1

# United States Patent Office 3,413,580
Patented Nov. 26, 1968

3,413,580
MULTI-COMPONENT ELECTROMAGNET
Christoph Gibas, Villingen, Germany, assignor to Binder Magnete KG., Villingen, Germany, a corporation of Germany
Filed July 1, 1966, Ser. No. 562,234
Claims priority, application Germany, July 2, 1965, B 82,652
8 Claims. (Cl. 335—279)

ABSTRACT OF THE DISCLOSURE

A plurality of separate magnetic cores, each having at least two parallel legs extending from a single yoke, each arranged in a ring in a manner whereby the leg at each end of the yoke of each core has a lateral surface lying flush against a lateral surface of the adjacent leg of the adjacent core. A plurality of windings are wound on the legs and provide an electromagnet.

---

My invention relates to electromagnets for operation with direct, alternating or poly-phase current.

In known electromagnets the magnetic core is composed of laminations of U or E shape and thus has at least two parallel legs and a yoke connecting them, the excitation winding being wound onto these legs. Such electromagnets have the disadvantage of a relatively high leakage flux, since this flux leaks from each lateral surface at both ends, adjacent to and remote from the yoke, of each leg carrying a winding and thus has components in a very wide variety of planes, whereas the useful flux, produced by the magnetic winding, passes essentially only through the plane determined by the legs and the yoke of the core.

It is an object of my invention to provide an electromagnet for direct, alternating or poly-phase current, whose magnetic core, consisting of at least two parallel legs and one interconnecting yoke, exhibits a greatly reduced leakage flux at the ends of the legs.

According to the invention an electromagnet for operation with direct, alternating or poly-phase current is provided with a plurality of separate magnetic cores, each of which has at least two parallel legs extending from a single yoke, the core being arranged in a ring in such a manner that the leg at each end of the yoke of each core has a lateral surface lying flush against a lateral surface of the adjacent leg of the adjacent core, a plurality of windings embracing the legs.

By virtue of the invention the leakage flux of an individual magnetic core is to a large extent absorbed by the neighboring core through the adjacent leg and is so concentrated in the neighboring core as to produce an additional component reinforcing the useful flux. As a result, a higher magnetic force is obtained with an electromagnet according to the invention than with known electromagnets for given dimensions and a given weight of copper and iron. Furthermore the formation of a closed series of magnetic cores according to the invention produces an approximation to a shielded or cup-type magnet which is known to have a minimum of leakage flux.

An electromagnet according to the invention can be advantageously used both in cases of which the cooperating armature has to cover only a short stroke and also in cases in which the armature must be displaced over a longer distance. Since in an electromagnet according to the invention the series of separate magnetic cores is closed upon itself so as to form a central opening, through which, for example, a shaft can be passed, the invention is particularly well suited for use with electromagnetically operable brakes and clutches.

The excitation coils preferably embrace the pairs of legs of adjacent cores which have lateral surfaces lying flush against each other.

In an advantageous embodiment of the electromagnet according to the invention, four magnetic cores of identical design have their yokes arranged in a square, the parallel legs of each core being located in the same plane as the yoke which connects them.

For connection to a three-phase current supply it is of advantage to provide the electromagnet according to the invention with three magnetic cores whose yokes define an equilateral triangle.

The electromagnet may have a cooperating armature comprising a plurality of separate components corresponding to, and arranged in, a corresponding fashion to the individual magnetic cores of the electromagnet.

The invention will now be explained in greater detail with reference to the accompanying diagrammatic drawings, in which.

Figure 1:
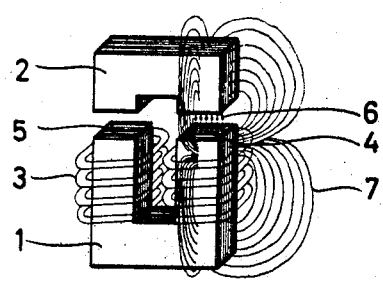
FIG. 1 shows a known alternating current magnet in perspective with a U-shaped magnetic core and an armature, connecting the free ends of the core legs.

FIG. 1 shows a conventional electromagnet composed of a U-shaped laminated core 1 and a laminated armature. The magnetic flux produced by the two coils of the excitation winding 3 is divided at the two pole faces 4 and 5 of the core 1 adjacent to the armature 2 into an effective or useful flux 6 passing through the armature 2 and a leakage flux 7. This leakage flux 7 emerges from each of the four lateral surfaces of the two core legs at one end thereof and passes back into each leg at its other end.

Figure 2:
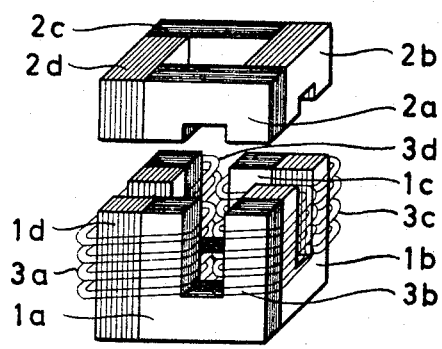
FIG. 2 shows, also in perspective, an electromagnet according to the invention, the magnetic core and armature of which are composed of a plurality of separate magnetic cores and armature components as shown in FIG. 1.

The electromagnet according to the invention shown in FIG. 2 has its core composed of four U-shaped component cores 1a to 1d according to FIG. 1. The parallel legs of each are located in the same plane as the magnetic yoke connecting them, and the component cores are arranged perpendicular to each other with the lateral surface of one leg of a U-shaped component core placed flush against one lateral surface of the neighboring side of the next U-shaped component core. The entire core thus forms a closed ring of component cores. The individual coils 3a to 3d of the excitation winding of the electromagnet are wound on or embrace the four pairs of flush legs of the neighboring U-shaped magnetic cores. If the excitation winding is to be connected to an alternating current supply, the polarity of the individual coils 3a to 3d should be selected in such a way that the polarity is identical at the pole faces of diagonally opposite pairs of legs consisting in each case of two adjacent legs, while at neighboring pairs of legs the opposite polarities occur.

As is also apparent from FIG. 2, the armature opposite the pole faces of the four U-shaped magnetic cores comprises four separate armature components 2a to 2d. The shape of the separate armature components corresponds to the armature 2 shown in FIG. 1, and the armature components are arranged in the same way as the U-shaped component cores 1a to 1d of the electromagnet in FIG. 2.

Figure 3:
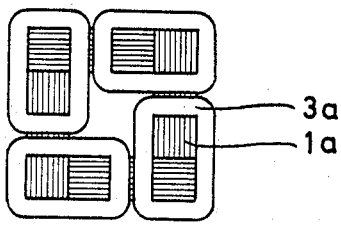
FIG. 3 is a plan view of the electromagnet shown in FIG. 2, with the omission of the armature.
Figure 4:
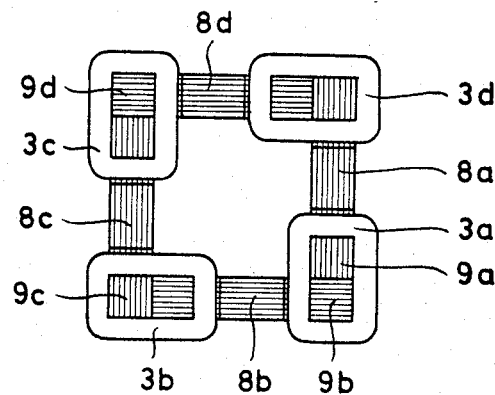
FIG. 4 is a plan view of another embodiment of the invention comprising four perpendicular arranged individual magnetic cores, each having an E-shape.

With reference to FIG. 4, the magnetic core comprises four separate component cores 9a to 9d of E-shaped configuration, which are arranged in the same way as the cores in FIGS. 2 and 3. The coils 3a to 3d, of which the excitation winding of the electromagnet is composed, are wound about the pairs of flush legs at the ends of the core yokes.

Figure 5:
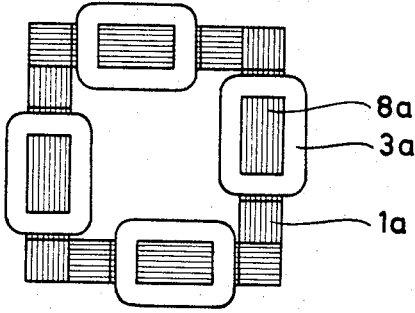
FIG. 5 is a plan view of the electromagnet shown in FIG. 4, in which, however, the excitation coils forming the excitation winding embrace the central limbs of the E-shaped individual magnetic cores.

As an alternative, the four coils 3a to 3d can, as shown in FIG. 5, be wound about the central legs 8a to 8d of the individual E-shaped cores.

Figure 6:
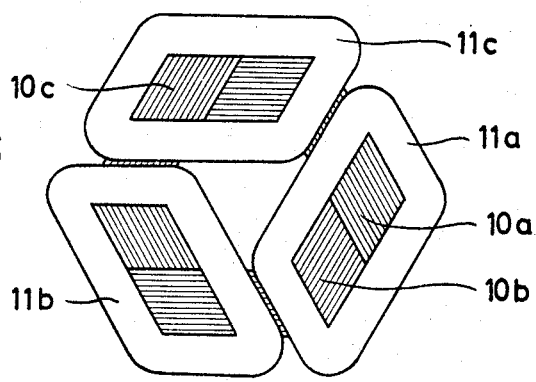
FIG. 6 is a plan view of a further electromagnet according to the invention, having only three separate magnetic cores.

In FIG. 6 an electromagnet is shown whose magnetic core consists of three separate U-shaped component cores 10a to 10c. One of the two parallel legs of each component core forms an angle of 120° with the magnetic yoke, so that the cores, when located with their lateral surfaces flush against each other, form a closed ring in the shape of a hexagon. The three separate coils 11a to 11c, which in this case are connected to a three-phase current supply, are wound about the pairs of adjacent legs of the neighboring component cores.

Figure 7:
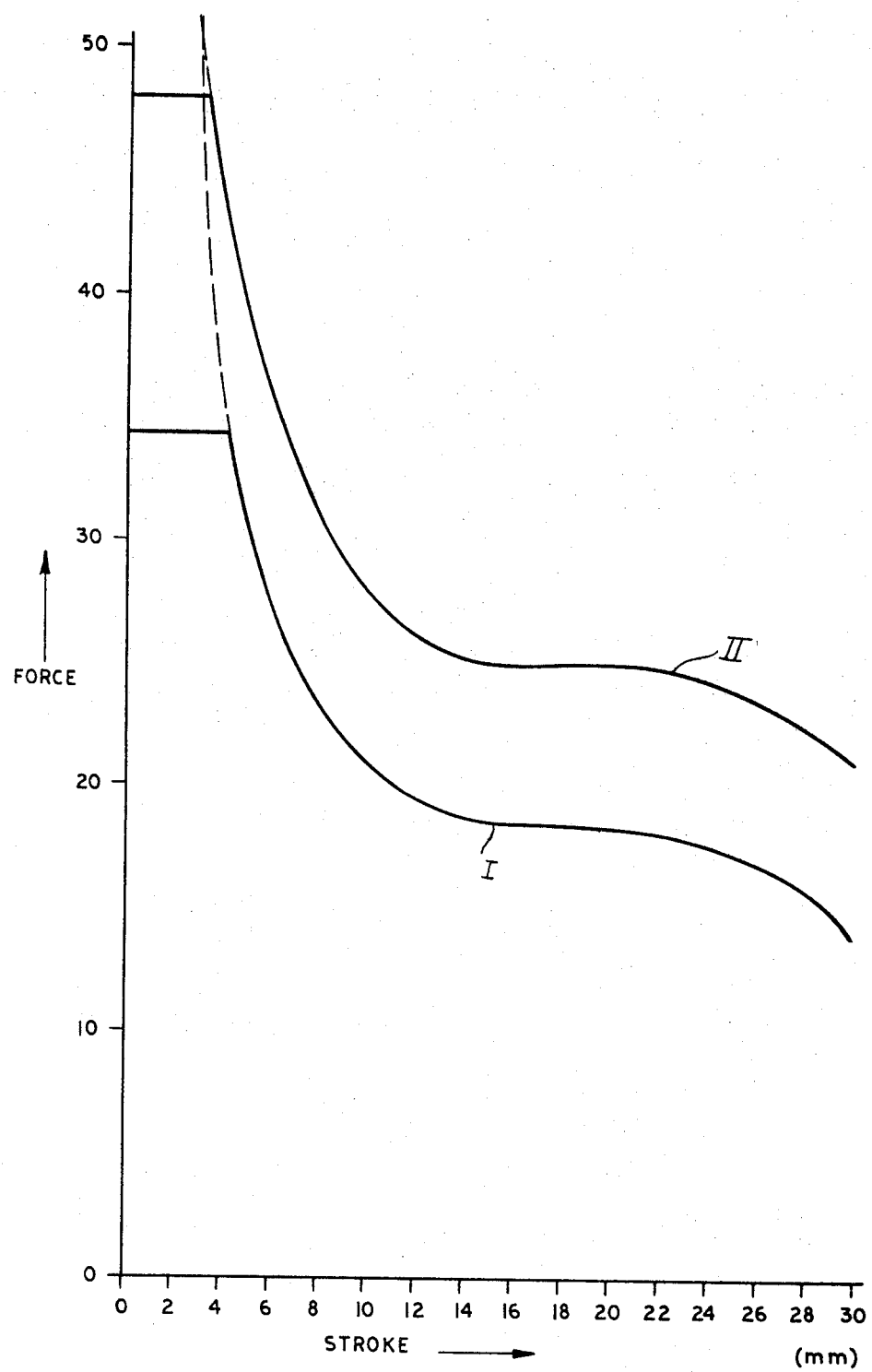
FIG. 7 shows a graph, in which the resultant force-versus-stroke curve of four simultaneously activated electromagnets according to FIG. 1 and the force-versus-stroke curve of the electromagnet shown in FIG. 2 are shown in a common diagram.

FIG. 7 shows for comparison, the force-versus-stroke curve II of an electromagnet according to the invention, as shown in FIG. 2 and also a force-versus-stroke curve I obtained with four known electromagnets as shown in FIG. 1 simultaneously activated to attract the same armature. It is apparent from a comparison of curves I and II that the force of the electromagnet according to FIG. 2 within the working range of the magnet is some 30% higher than the force obtained with a known magnet. In both cases the respective magnet structures had the same dimensions and the same weight of iron and copper.

If an electromagnet according to the invention is to be used as a long-stroke magnet, it is desirable for the armature to be fitted with larger limbs than those shown in FIG. 2. The coils will then be longer, so that the air gaps are located in the interior of the coils.

I claim:
1. An electromagnet for direct, alternating or polyphase current, comprising a plurality of separate magnetic cores, each of which has a single yoke and at least two parallel legs extending from said yoke, the cores being arranged in a ring, the leg at each end of the yoke of each core having a lateral surface lying flush against a lateral surface of the adjacent leg of the adjacent core, and a plurality of windings embracing the legs.

2. An electromagnet according to claim 1, wherein the windings embrace at least some of the pairs of legs of adjacent cores which have lateral surfaces lying flush against each other.

3. An electromagnet according to claim 1, wherein there are four cores with their yokes defining a square.

4. An electromagnet according to claim 1, wherein there are three cores with their yokes defining an equilateral triangle.

5. An electromagnet according to claim 1, in combination with a cooperating armature comprising a plurality of separate components corresponding to and arranged in a corresponding fashion to the separate cores.

6. An electromagnet as claimed in claim 5, wherein the windings are wound on at least some of the pairs of legs of adjacent cores having lateral surfaces lying flush against each other.

7. An electromagnet as claimed in claim 5, wherein the plurality of cores comprises four cores, the yokes of which form a square.

8. An electromagnet as claimed in claim 5, wherein said plurality of cores comprises three cores, the yokes of which form an equilateral triangle.

References Cited

UNITED STATES PATENTS

| | | | |
|---|---|---|---|
| 850,714 | 4/1907 | Allen et al. | 336—212 |
| 1,644,729 | 10/1927 | Johannesen | 336—212 |
| 2,617,090 | 11/1952 | Ogle | 336—212 XR |
| 2,662,192 | 12/1953 | Weyandt | 335—279 XR |

GEORGE HARRIS, *Primary Examiner.*